(12) United States Patent
Buzzard

(10) Patent No.: US 8,997,603 B2
(45) Date of Patent: Apr. 7, 2015

(54) STEERING COLUMN ASSEMBLY WITH IMPROVED ATTACHMENT TO A VEHICLE STRUCTURE

(71) Applicant: Donald A. Buzzard, Saginaw, MI (US)

(72) Inventor: Donald A. Buzzard, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 104 days.

(21) Appl. No.: 13/804,659

(22) Filed: Mar. 14, 2013

(65) Prior Publication Data

US 2014/0260758 A1 Sep. 18, 2014

(51) Int. Cl.
*B62D 1/18* (2006.01)
*B62D 1/184* (2006.01)

(52) U.S. Cl.
CPC ...................... *B62D 1/184* (2013.01)

(58) Field of Classification Search
CPC ......... B62D 1/184; B62D 1/185; B62D 1/187
USPC ............................................. 74/493; 280/775
See application file for complete search history.

(56) References Cited

U.S. PATENT DOCUMENTS

| | | | |
|---|---|---|---|
| 5,607,184 A * | 3/1997 | Barton | 280/775 |
| 6,695,349 B2 * | 2/2004 | Bohlen et al. | 280/775 |
| 6,860,669 B2 | 3/2005 | Laisement et al. | |
| 7,354,069 B2 * | 4/2008 | Yamada | 280/775 |
| 7,770,488 B2 * | 8/2010 | Kim et al. | 74/493 |
| 7,963,561 B2 * | 6/2011 | Waibel et al. | 280/777 |
| 8,042,426 B2 * | 10/2011 | Jo | 74/493 |
| 2003/0172765 A1 | 9/2003 | Heiml | |
| 2005/0104353 A1 * | 5/2005 | Ikeda et al. | 280/775 |
| 2006/0214410 A1 * | 9/2006 | Sawada et al. | 280/775 |
| 2009/0282945 A1 * | 11/2009 | Streng et al. | 74/493 |
| 2010/0326230 A1 * | 12/2010 | Oh | 74/493 |
| 2011/0056324 A1 * | 3/2011 | Park et al. | 74/493 |
| 2011/0187089 A1 * | 8/2011 | Sakata | 280/775 |

* cited by examiner

*Primary Examiner* — James English
(74) *Attorney, Agent, or Firm* — Cantor Colburn LLP

(57) ABSTRACT

A steering column assembly comprises an upper column jacket, a collar assembly, a position lock bracket, and a guide clamp. A guide shaft extends from a guide end of the collar assembly, and a cam shaft extends from a cam end of the collar assembly. The guide shaft extends through an adjustment channel defined in the position lock bracket, and the cam shaft extends through an adjustment channel defined in the position lock bracket. A guide clamp is disposed along the guide shaft between the upper column jacket and the position lock bracket, and a guide retainer is fixed to the guide shaft such that, when the steering column assembly is in a locked mode, the guide clamp is placed in compression between the upper column jacket and the position lock bracket, which is placed in compression between the guide clamp and the guide retainer.

19 Claims, 3 Drawing Sheets

A-A

B-B

STEERING COLUMN ASSEMBLY WITH IMPROVED ATTACHMENT TO A VEHICLE STRUCTURE

BACKGROUND OF THE INVENTION

The present invention relates to steering columns and more particularly to a system for attaching a steering column assembly to, and releasing the steering column assembly from, a structure of a vehicle.

Market forces are inducing vehicle suppliers to seek ways of meeting the sometimes conflicting desires to incorporate new features into the areas surrounding the vehicle steering column while also providing more compact vehicles. As a result, demands for space surrounding the steering column have increased while the space available has decreased. In particular, it is becoming more and more common for the space above and below the column to be limited. These space-based constraints have posed challenges to designers seeking to meet requirements relating to structural attachment of the steering column to the vehicle, to safety and reliability, and also to convenience. In particular, consumer desires for the ability to adjust positioning of the steering column have not decreased to accommodate the above-described increasing demands for space.

Accordingly, it is desirable to have improved systems and methods for selectively fixing and releasing a steering column while also providing for safe and reliable structural attachment of the steering column within reduced spaces above and beneath the steering column. It is also desirable to have a system and method for selectively fixing and releasing a steering column wherein the clamping hardware is disposed primarily toward a side of the steering column (e.g., arranged substantially horizontally from a centerline of the steering column).

SUMMARY OF THE INVENTION

In one exemplary embodiment of the invention, a steering column assembly comprises an upper column jacket, a collar assembly disposed about the upper column jacket, a collar assembly, a position lock bracket, and a guide clamp. The collar assembly has guide end and a cam end, with the guide end including a guide shaft that extends outwardly from the guide end along a lock axis, and with the cam end including a cam shaft that extends outwardly from the cam end along the lock axis.

The position lock bracket is attached to the vehicle and is disposed about the collar assembly. The position lock bracket has a first lock wall and a second lock wall. The guide shaft extends through an adjustment channel defined in the first lock wall, and the cam shaft extends through an adjustment channel defined in the second lock wall.

A guide clamp is disposed along the guide shaft between the upper column jacket and the first lock wall, and a guide retainer is fixed to the guide shaft such that, when the steering column assembly is in a locked mode, the guide clamp is placed in compression between the upper column jacket and the first lock wall and the first lock wall is placed in compression between the guide clamp and the guide retainer.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
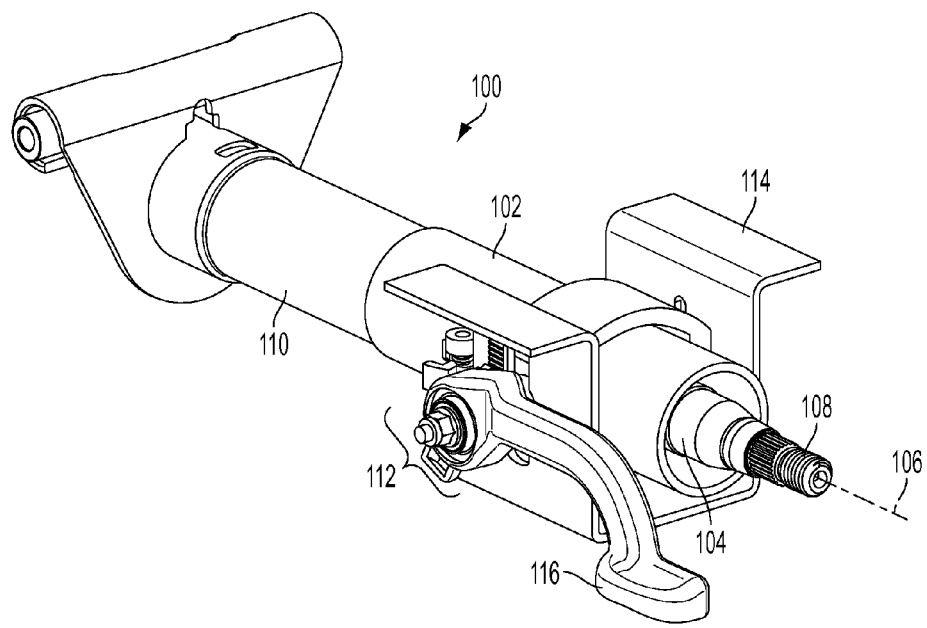
FIG. 1 shows a perspective view of an exemplary steering column assembly.
Figure 2:
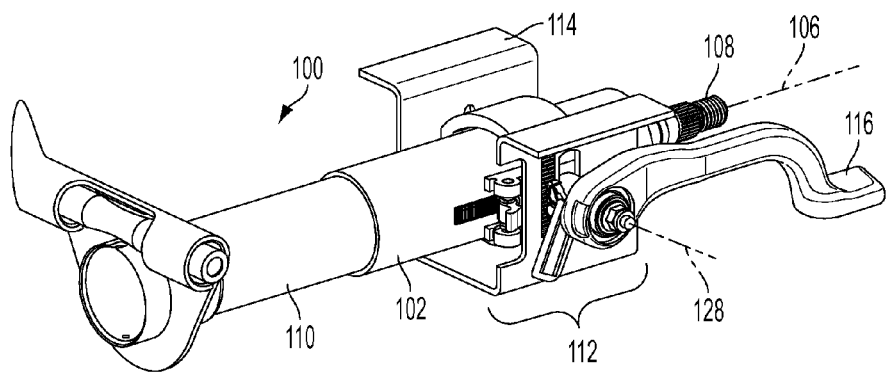
FIG. 2 shows a perspective view of an exemplary steering column assembly.
Figure 3:
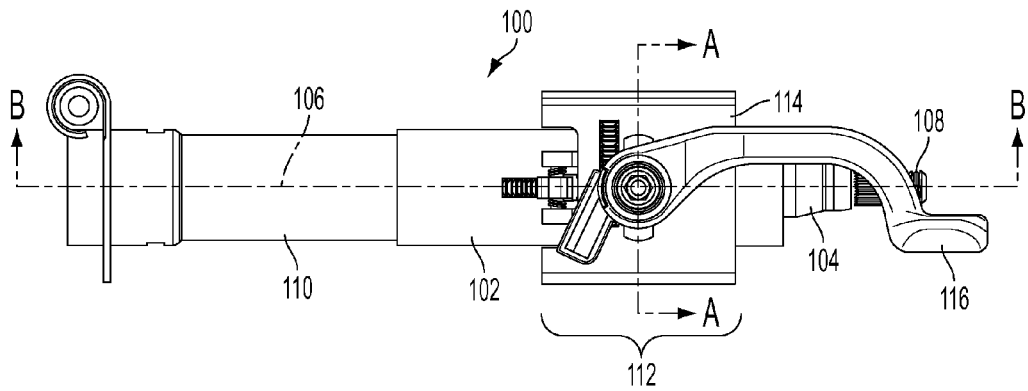
FIG. 3 shows a side view of an exemplary steering column assembly.

Referring now to the Figures, where the invention will be described with reference to specific embodiments, without limiting same, FIGS. 1-2 show perspective views, and FIG. 3 shows a side view, of a steering column assembly 100 in accordance with exemplary embodiments of the invention. As shown in FIGS. 1-3, the steering column assembly 100 comprises an upper column jacket 102, through which a steering control shaft 104 is supported for rotation about a longitudinal column axis 106. At an operator end (i.e., an upper end) 108, the steering control shaft 104 is configured for interacting with a steering wheel or other user-operated control device (not shown) for facilitating user control of a vehicle, to which the steering column assembly 100 is attached. At an opposite end (i.e., a lower end), the steering control shaft 104 is coupled (e.g., via an intermediate shaft and/or via one or more gear mechanisms) to a steerable wheel of the vehicle. Thus, as an operator rotates the steering wheel or other user-operated control device, the steering control shaft 104 rotates about the longitudinal column axis 106, and control of the vehicle is provided.

In an exemplary embodiment, the upper column jacket 102 defines an internal cavity, within which the steering control shaft 104 is supported, and an inner column jacket 110 may also disposed within this internal cavity. The inner column jacket 110 may be in direct contact with the upper column jacket 102 or they may be separated by a bushing or bearing assembly to facilitate reliable telescoping movement relative to one another while also providing structural coupling between the inner column jacket 110 and the upper column jacket 102. Thus, the inner column jacket 110 and the upper column jacket 102 are configured for telescoping movement along the longitudinal column axis 106.

In an exemplary embodiment, the longitudinal column axis 106 is arranged in a vertically oriented plane that is parallel to a longitudinal axis of the vehicle. Adjustments to the position and orientation of the steering column assembly 100 may be facilitated in either or both of: (1) along the of the longitudinal column axis 106 (i.e., in a telescoping direction); and (2) in a vertical (i.e., raking) direction substantially perpendicular to the longitudinal column axis 106. To facilitate such adjustments to the position and orientation of the steering column assembly 100, as shown in FIGS. 1-3, the steering column assembly 100 includes a position lock mechanism 112.

To enable a locked mode, wherein changes to the position of an operator end 108 of the steering control shaft 104 are substantially inhibited, the position lock mechanism 112 is configured to substantially fix a position of the upper column jacket 102 relative to a position lock bracket 114, and thus the vehicle, when the position lock mechanism 112 occupies the locked mode. Similarly, to enable an adjustment mode, wherein changes to a position of the operator end 108 of the steering control shaft 104 are facilitated, the position lock mechanism 112 is configured to permit adjustments to the position of the upper column jacket 102 relative to the position lock bracket 114, and thus the vehicle, when the position lock mechanism 112 occupies the adjustment mode.

Those skilled in the art will appreciate that a number of systems and methods are known for enabling the above-described locked mode and adjustment mode. For example, a locked mode may be activated by imposing a compressive load between adjacent friction lock members or by engaging sets of mating gears so as to inhibit relative movement. Similarly, an adjustment mode may be activated by releasing the compressive loads or disengaging the gear teeth. To provide operator selectivity between a locked mode and an adjustment mode, an adjustment lever arm 116 may be provided for releasing or applying the compressive load (or for engaging and disengaging the gear teeth) based on the position of the adjustment lever arm 116.

In an exemplary embodiment, the position lock mechanism 112 includes a rake lock actuator (not shown) and/or a telescope lock actuator (not shown). The adjustment lever arm 116 is coupled to the rake lock actuator and/or the telescope lock actuator such that the vehicle operator may select (e.g., by manipulating the adjustment lever arm 116) whether the position lock mechanism 112 is to occupy the locked mode or the adjustment mode. In embodiments that provide for telescoping adjustments of the steering column assembly 100, the position lock mechanism 112 is configured to cooperate so as to selectively enable such telescoping adjustments while in the adjustment mode and to prevent such telescoping adjustments while in the locked mode. Similarly, in embodiments that provide for raking adjustments of the steering column assembly 100, the position lock mechanism 112 is configured to selectively enable such raking adjustments while in the adjustment mode and to prevent such raking adjustments while in the locked mode.

During normal operation of the vehicle, the position lock mechanism 112 occupies a locked mode such that the upper column jacket 102 is fixed relative to the position lock bracket 114. To enhance vehicle safety in situations wherein the vehicle encounters an excessive acceleration (e.g., such that a vehicle occupant may impact or press against the steering column assembly 100), the position lock mechanism 112 may be configured to release from the vehicle upon imposition of an impact force of sufficient magnitude. Alternatively, it may be the position lock mechanism 112 that is configured to selectively release the upper column jacket 102. In either of these configurations, however, the fixed relationship between the steering column assembly 100 and the vehicle is to be released upon the occurrence of a predefined event or satisfaction of predetermined criteria. Thus, it is important for the attachment system and method to provide a reliable, yet releasable, structural attachment between the steering column and the vehicle.

Figure 4:
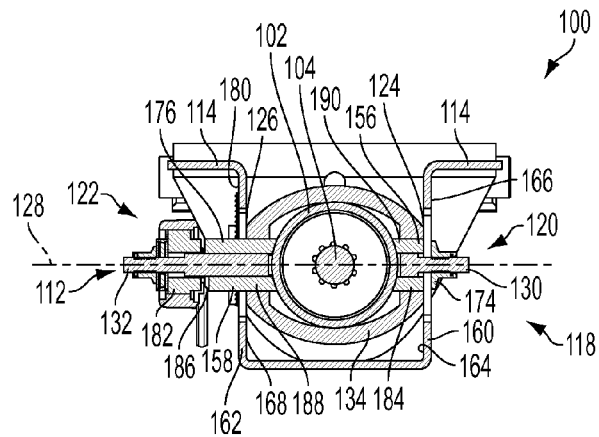
FIG. 4 shows a cutaway end view of an exemplary steering column assembly, with the steering column assembly being cut at a plane A-A as shown in FIG. 3.
Figure 5:
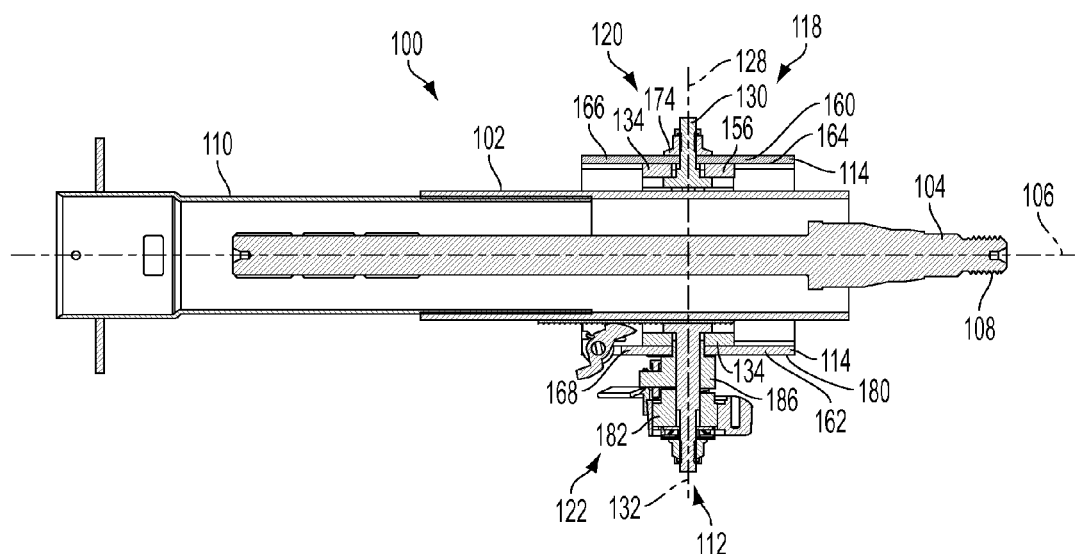
FIG. 5 shows a cutaway top view of an exemplary steering column assembly, with the steering column assembly being cut at a plane B-B as shown in FIG. 3.
Figure 6:
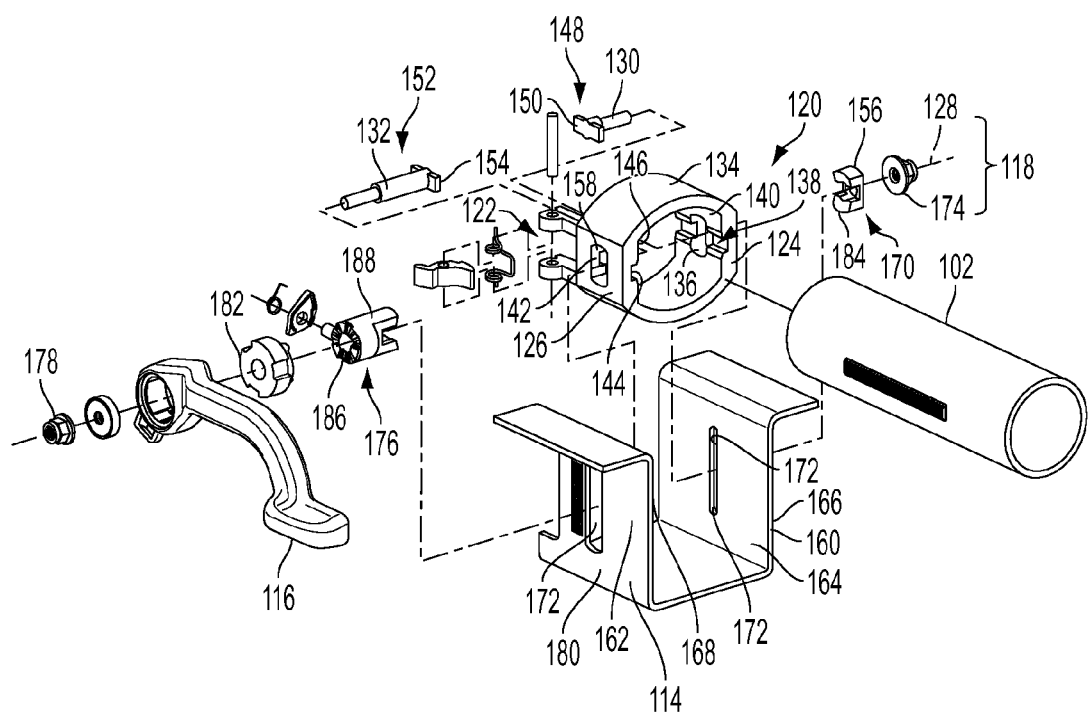
FIG. 6 shows an exploded view of an exemplary position lock mechanism for an adjustable steering column assembly.

FIGS. 4 and 5 show cutaway views of an exemplary steering column assembly 100. FIG. 4 is an end view, viewed from the operator end 108 of the steering column assembly 100, with the steering column assembly 100 being cut at a plane A-A (shown in FIG. 3) that bisects the position lock mechanism 112. FIG. 5 is a top view of the steering column assembly 100, with the steering column assembly 100 being cut at a plane B-B (also shown in FIG. 3) that bisects the position lock mechanism 112. FIG. 6 shows an exploded view of an exemplary position lock mechanism 112 for an adjustable steering column assembly 100. As shown in FIGS. 4-6, in various exemplary embodiments, the position lock mechanism 112 comprises a collar assembly 118 disposed about the upper column jacket 102.

The collar assembly 118 has a guide end 120 and a cam end 122, with the guide end 120 defining a first planar surface 124, and the cam end 122 defining a second planar surface 126. The first planar surface 124 is oriented substantially in parallel to the second planar surface 126. The guide end 120 (with its outwardly facing first planar surface 124) and the cam end 122 (with its outwardly facing second planar surface 126) define a lock axis 128. The lock axis 128 is disposed horizontally, perpendicular to the longitudinal column axis 106. In an exemplary embodiment, the lock axis 128 is disposed generally horizontally and passes through, or nearly through, the longitudinal column axis 106. The guide end 120 includes a guide shaft 130 that extends outwardly from the first planar surface 124, along the lock axis 128. The cam end 122 includes a cam shaft 132 that extends outwardly from the second planar surface 126, along the lock axis 128.

In an exemplary embodiment, the collar assembly 118 comprises a clamp ring 134 that is configured to extend around the upper column jacket 102 so that the collar assembly 118 may be installed about the upper column jacket 102. In this exemplary embodiment, the clamp ring 134 includes the guide end 120 and the cam end 122 as described above. The guide end 120 defines a guide shaft passage 136 that extends through the guide end 120. The guide end 120 also defines a guide shaft keyway 138 that extends along a first inside surface 140 of the guide end 120, transversely to the lock axis 128. Similarly, the cam end 122 defines a cam shaft passage 142 that extends through the cam end 122. The cam end 122 also defines and a cam shaft keyway 144 that extends along a second inside surface 146 of the cam end 122, transversely to the lock axis 128.

In this embodiment, a guide shaft insert 148 is configured for assembly with the guide end 120 and includes a guide shaft base 150 that is configured to seat into the guide shaft keyway 138 so as to position the guide shaft insert 148 relatively to the guide end 120 of the clamp ring 134 and to prevent the guide shaft insert 148 from rotating about the lock axis 128. The guide shaft insert 148 provides a guide shaft 130, which, upon assembly of the guide shaft insert 148 with the guide end 120 of the clamp ring 134, passes through the guide shaft passage 136 and extends from the guide end 120 along the lock axis 128.

Similarly, a cam shaft insert 152 is configured for assembly with the cam end 122 and includes a cam shaft base 154 that is configured to seat into the cam shaft keyway 144 so as to position the cam shaft insert 152 relatively to the cam end 122 of the clamp ring 134 and to prevent the cam shaft insert 152 from rotating about the lock axis 128. The cam shaft insert 152 provides a cam shaft 132, which, upon assembly of the cam shaft insert 152 with the cam end 122 of the clamp ring 134, passes through the cam shaft passage 142 and extends from the cam end 122 along the lock axis 128. In an exemplary embodiment, the cam end 122 defines one or more cam clamp passages 158 adjacent to the lock axis 128 and to the cam shaft 132 that extends from the cam end 122 along the lock axis 128.

As shown in FIGS. 4-6, and as briefly disclosed above, in an exemplary embodiment, the position lock mechanism 112 also comprises position lock bracket 114 that is disposed about the generally cylindrical upper column jacket 102 and the collar assembly 118. The position lock bracket 114 includes a first lock wall 160 and a second lock wall 162, which may be attached to one another. For example, as shown in FIGS. 4-6, the first lock wall 160 and the second lock wall 162 may be cantilevered from a base such that they may be flexed somewhat so as to take up slack caused by part to part variations and to facilitate changes between the locked mode and the adjustment mode. The first lock wall 160 is disposed in an approximately vertical plane adjacent to the guide end 120. The first lock wall 160 has a first inner lock surface 164 that faces toward the collar assembly 118 and a first outer lock surface 166 that faces away from the collar assembly 118. The first lock wall 160 defines an adjustment channel 172, through which the guide shaft 130 passes, along which the guide shaft 130 is constrained to move (e.g., in a raking direction) when the position lock mechanism 112 is in an adjustment mode, and relative to which the guide shaft 130 is fixed when the position lock mechanism 112 is in a locked mode.

The second lock wall 162 is disposed in an approximately vertical plane adjacent to the cam end 122. The second lock wall 162 has a second inner lock surface 168 that faces toward the collar assembly 118 and a second outer lock surface 180 that faces away from the collar assembly 118. The second lock wall 162 defines an adjustment channel 172, through which the cam shaft 132 passes, along which the cam shaft 132 is constrained to move (e.g., in a raking direction) when the position lock mechanism 112 is in an adjustment mode, and relative to which the cam shaft 132 is fixed when the position lock mechanism 112 is in a locked mode. As shown in FIGS. 4-6, in an exemplary embodiment, the position lock mechanism 112 also comprises a guide clamp 170 that is disposed about the guide shaft 130. The guide clamp 170 has a guide clamp base 156 positioned against the first inner lock surface 164. The guide clamp 170 also has one or more guide clamp arms 184 that contact the upper column jacket 102. A guide retainer 174 is disposed on the guide shaft 130 and positioned against the first outer lock surface 166.

The position lock mechanism 112 also comprises a cam clamp 176 that is disposed about the cam shaft 132. The cam clamp 176 has a cam clamp base 186 positioned against an outer cam 182. The cam clamp 176 also has one or more cam clamp arms 188 that extend through the cam clamp passages 158 of the cam end 122 of the clamp ring 134 and contact the upper column jacket 102. A cam retainer 178 and the outer cam 182 are disposed on the cam shaft 132 with the cam retainer 178 being positioned against the outer cam 182. The outer cam 182 and the cam clamp 176 are configured to cooperate with one another such that as the outer cam 182 is rotated about the lock axis 128, a combined length of the outer cam 182 and the cam clamp 176 changes, thereby causing the cam clamp arms 188 to either impose a locking force (balanced by tension in the cam shaft 132) upon the cam clamp 176 or to release the locking force from the cam clamp 176.

Accordingly, actuation of the adjustment lever arm 116 so as to cause the outer cam 182 to be rotated, has the effect of increasing or decreasing tension in the cam shaft 132 by increasing or decreasing combined length of the cam clamp 176 and the outer cam 182, which are both disposed between the cam retainer 178 and the upper column jacket 102. Put another way, the adjustment lever arm 116 is configured to rotate the outer cam 182 as the lever arm is manipulated, causing the outer cam 182 to draw the cam clamp 176 toward or away from the upper column jacket 102. Thus, the position lock mechanism 112 is configured to facilitate selectively enabling (i.e., in an adjustment mode) adjustments to the position of the upper column jacket 102, and thus the operator end 108 of the steering control shaft 104, within a range of adjustment provided by a rake adjustment channel 172, which is defined in the position lock bracket 114.

In an exemplary embodiment, the lock axis 128 is disposed perpendicular to the first lock wall 160 and the second lock wall 162 of the position lock bracket 114, and is positioned within (i.e., as passing through) the rake adjustment channel 172, such that, as a position of the upper column jacket 102 is adjusted, the lock axis 128, which is coupled for movement with the upper column jacket 102, traverses a range of motion within the rake adjustment channel 172. As the adjustment lever arm 116 is rotated to the locked position, the cam clamp 176 is pressed though the second lock wall 162 and the collar assembly 118, along the lock axis 128 and against the upper column jacket 102, which is pressed against the guide clamp 170, thereby compressing the position lock bracket 114 between the guide clamp 170 and the guide retainer 174, and thereby fixing the side 120 to the position lock bracket 114 so as to resist relative movement there between. At approximately the same time, the first inner lock surface 164 pressed against the 124, forcing the 126 of the 134 to press against the 168 of the 162, thereby compressing the position lock bracket 114 between the cam clamp 176 and the collar assembly 118, thereby fixing the side 122 to the position lock bracket 114 so as to resist relative movement there between.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly for a vehicle comprising:
an upper column jacket, through which a steering control shaft is supported for rotation about a longitudinal column axis;
a collar assembly disposed about the upper column jacket, the collar assembly having a guide end and a cam end, the guide end including a guide shaft that extends outwardly from the guide end along a lock axis, the cam end including a cam shaft that extends outwardly from the cam end along the lock axis;
a position lock bracket attached to the vehicle and disposed about the collar assembly, the position lock bracket having a first lock wall and a second lock wall, the guide shaft extending through an adjustment channel defined in the first lock wall, the cam shaft extending through an adjustment channel defined in the second lock wall;
a guide clamp disposed along the guide shaft between the upper column jacket and the first lock wall and a guide retainer fixed to the guide shaft such that, when the steering column assembly is in a locked mode, the guide clamp is placed in compression between the upper column jacket and the first lock wall and the first lock wall is placed in compression between the guide clamp and the guide retainer;
wherein the collar assembly comprises a clamp ring that is configured to extend around the upper column jacket, the guide end defining a guide shaft passage that extends through the guide end, and the guide shaft provided by a guide shaft insert configured for assembly with a guide shaft end of the clamp ring;

wherein the guide end defines a guide shaft keyway that extends along a first inside surface of the guide end, transversely to the lock axis; and wherein the guide shaft insert includes a guide shaft base that is configured to seat into the guide shaft keyway so as to position the guide shaft insert relatively to the guide end of the clamp ring and to prevent the guide shaft insert from rotating about the lock axis.

2. A steering column assembly as claimed in claim 1, further comprising a cam clamp disposed along the cam shaft between the upper column jacket and an outer cam, the outer cam being disposed along the cam shaft between the cam clamp and a cam retainer such that, when the steering column assembly is in the locked mode, the outer cam is placed in compression between the cam retainer and the cam clamp, the cam clamp is placed in compression between the outer cam and the second lock wall.

3. A steering column assembly as claimed in claim 2, wherein, when the steering column assembly is in the locked mode, the second lock wall is placed in compression between the cam clamp and the collar assembly.

4. A steering column assembly as claimed in claim 2, wherein, when the steering column assembly is in the locked mode, the collar assembly is placed in compression between the second lock wall and the guide clamp.

5. A steering column assembly as claimed in claim 2, wherein the outer cam is configured so as to bias the cam clamp to move toward the upper column jacket when the outer cam is positioned in the locked mode.

6. A steering column assembly as described in claim 1, wherein the guide end defines a first planar surface and the cam end defines a second planar surface, the first planar surface oriented substantially in parallel to the second planar surface.

7. A steering column assembly as described in claim 1, wherein the cam end defines a cam shaft passage that extends through the cam end, the cam shaft provided by a cam shaft insert configured for assembly with the cam end.

8. A steering column assembly as described in claim 7, wherein the cam end defines a cam shaft keyway that extends along a second inside surface of the cam end, transversely to the lock axis.

9. A steering column assembly as described in claim 8, wherein the cam shaft insert includes a cam shaft base that is configured to seat into the cam shaft keyway so as to position the cam shaft insert relatively to the cam end of the clamp ring and to prevent the cam shaft insert from rotating about the lock axis.

10. A steering column assembly as described in claim 2, wherein the cam end defines one or more cam clamp passages adjacent to the lock axis, through which one or more arms of the cam clamp extend.

11. A steering column assembly as described in claim 1, wherein the first lock wall and the second lock wall are cantilevered from a base.

12. A steering column assembly as described in claim 1, wherein the lock axis is disposed horizontally, substantially perpendicular to the longitudinal column axis.

13. A steering column assembly as described in claim 1, wherein the lock axis is disposed generally horizontally and passes approximately through the longitudinal column axis.

14. A steering column assembly as described in claim 1, wherein the first lock wall is disposed in an approximately vertical plane.

15. A steering column assembly as described in claim 1, wherein the first lock wall defines a rake adjustment channel, through which the guide shaft passes, along which the guide shaft is constrained to move when the steering column assembly is in an adjustment mode, and relative to which the guide shaft is fixed when the steering column assembly is in the locked mode.

16. A steering column assembly as described in claim 1, wherein the second lock wall is disposed in an approximately vertical plane.

17. A steering column assembly as described in claim 1, wherein the second lock wall defines a rake adjustment channel, through which the cam shaft passes, along which the cam shaft is constrained to move when the steering column assembly is in an adjustment mode, and relative to which the cam shaft is fixed when the steering column assembly is in the locked mode.

18. A steering column assembly for a vehicle comprising:
an upper column jacket, through which a steering control shaft is supported for rotation about a longitudinal column axis;
a collar assembly disposed about the upper column jacket, the collar assembly having a guide end and a cam end, the guide end including a guide shaft that extends outwardly from the guide end along a lock axis, the cam end including a cam shaft that extends outwardly from the cam end along the lock axis;
a position lock bracket attached to the vehicle and disposed about the collar assembly, the position lock bracket having a first lock wall and a second lock wall, the guide shaft extending through an adjustment channel defined in the first lock wall, the cam shaft extending through an adjustment channel defined in the second lock wall;
a guide clamp disposed along the guide shaft between the upper column jacket and the first lock wall and a guide retainer fixed to the guide shaft such that, when the steering column assembly is in a locked mode, the guide clamp is placed in compression between the upper column jacket and the first lock wall and the first lock wall is placed in compression between the guide clamp and the guide retainer;
wherein the collar assembly comprises a clamp ring that is configured to extend around the upper column jacket, the cam end defining a cam shaft passage that extends through the cam end, the cam shaft provided by a cam shaft insert configured for assembly with the cam end;
wherein the cam end defines a cam shaft keyway that extends along a second inside surface of the cam end, transversely to the lock axis; and
wherein the cam shaft insert includes a cam shaft base that is configured to seat into the cam shaft keyway so as to position the cam shaft insert relatively to the cam end of the clamp ring and to prevent the cam shaft insert from rotating about the lock axis.

19. A steering column assembly for a vehicle comprising:
an upper column jacket, through which a steering control shaft is supported for rotation about a longitudinal column axis;
a collar assembly disposed about the upper column jacket, the collar assembly having a guide end and a cam end, the guide end including a guide shaft that extends outwardly from the guide end along a lock axis, the cam end including a cam shaft that extends outwardly from the cam end along the lock axis;
a position lock bracket attached to the vehicle and disposed about the collar assembly, the position lock bracket having a first lock wall and a second lock wall, the guide shaft extending through an adjustment channel defined in the first lock wall, the cam shaft extending through an adjustment channel defined in the second lock wall;

a guide clamp disposed along the guide shaft between the upper column jacket and the first lock wall and a guide retainer fixed to the guide shaft such that, when the steering column assembly is in a locked mode, the guide clamp is placed in compression between the upper column jacket and the first lock wall and the first lock wall is placed in compression between the guide clamp and the guide retainer;

wherein the collar assembly comprises a clamp ring that is configured to extend around the upper column jacket, the guide end defining a guide shaft passage that extends through the guide end, and the cam end defining a cam shaft passage that extends through the cam end;

wherein the guide end of the clamp ring defines a guide shaft keyway that is formed in and extends along a first inside surface of the clamp ring guide end; and wherein the cam end of the clamp ring defines a cam shaft keyway that is formed in and extends along a second inside surface of the clamp ring cam end.

* * * * *